United States Patent
Poisner

(10) Patent No.: US 6,754,840 B2
(45) Date of Patent: *Jun. 22, 2004

(54) OVER-CLOCKING DETECTION SYSTEM UTILIZING A REFERENCE SIGNAL AND THEREAFTER PREVENTING OVER-CLOCKING BY REDUCING CLOCK RATE

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/315,156

(22) Filed: Dec. 10, 2002

(65) Prior Publication Data

US 2003/0065966 A1 Apr. 3, 2003

Related U.S. Application Data

(63) Continuation of application No. 09/407,853, filed on Sep. 29, 1999.

(51) Int. Cl.[7] .................................................. G06F 1/04
(52) U.S. Cl. ...................................................... 713/500
(58) Field of Search ................................ 713/500, 501, 713/600; 370/507

(56) References Cited

U.S. PATENT DOCUMENTS

| 5,274,337 | A | * | 12/1993 | Young et al. ................. 327/49 |
| 5,280,605 | A | * | 1/1994 | Young et al. ................. 713/501 |
| 5,592,111 | A | | 1/1997 | Wong et al. |
| 5,671,195 | A | | 9/1997 | Lee |
| 5,696,950 | A | | 12/1997 | Ichinose et al. |
| 5,713,030 | A | | 1/1998 | Evoy |
| 5,734,274 | A | * | 3/1998 | Gavish ....................... 327/525 |
| 6,055,645 | A | | 4/2000 | Noble |
| 6,211,744 | B1 | | 4/2001 | Shin |
| 6,255,893 | B1 | * | 7/2001 | Dishongh et al. ........... 327/525 |
| 6,385,735 | B1 | * | 5/2002 | Wilson et al. ............... 713/501 |

FOREIGN PATENT DOCUMENTS

GB      2170337 A   *   7/1986   ............. G06F/9/28

OTHER PUBLICATIONS

Simon Watson, Manufactures preventing overclocking, Jan. 24, 1995, Newsgroups: comp.sys.ibm.pc.hardware.chips.*

* cited by examiner

*Primary Examiner*—Thomas Lee
*Assistant Examiner*—Suresh K Suryawanshi
(74) *Attorney, Agent, or Firm*—Schwegman, Lundberg, Woessner & Kluth, P.A.

(57) ABSTRACT

An over-clock deterrent mechanism of a chipset which comprises an over-clock detection circuit for detecting over-clocking of a system (processor) clock signal based on comparison of ratio of the system (processor) clock signal which is likely to be over-clocked and a fixed, stable reference clock signal which is highly unlikely to be over-clocked, and an over-clock prevention (thwarting) circuit for deterring such an over-clocking by either disabling operations of a computer system or significantly undermining key operations of a computer system.

21 Claims, 7 Drawing Sheets

OVER-CLOCKING DETECTION SYSTEM UTILIZING A REFERENCE SIGNAL AND THEREAFTER PREVENTING OVER-CLOCKING BY REDUCING CLOCK RATE

CROSS-REFERENCE TO RELATED APPLICATION

This application is a continuation of U.S. application Ser. No. 09/407,853, filed Sep. 29, 1999.

TECHNICAL FIELD

The present invention relates to a computer system having a system clock signal which can operate at different speeds in different systems, and more particularly, relates to a mechanism and method for detecting and deterring over-clocking of such a system clock signal in a computer system.

BACKGROUND

A typical computer system includes a processor subsystem of one or more microprocessors such as Intel® i386, i486, Celeron™ or Pentium® processors, a memory subsystem, one or more chipsets provided to support different types of host processors for different platforms such as desktops, personal computers (PC), servers, workstations and mobile platforms, and to provide an interface with a plurality of input/output (I/O) devices. Chipsets may integrate a large amount of I/O bus interface circuitry and other circuitry onto only a few chips. Examples of such chipsets may include Intel® 430, 440 and 450 series chipsets, and more recently Intel® 810 and 8XX series chipsets. These chipsets may implement the I/O bus interface circuitry, timer, real-time clock (RTC), direct memory access (DMA) controller, and other additional functionality such as, for example, integrated power and thermal management with quick resume capabilities and random seed number generation for security applications such as cryptography, digital signatures, and protected communication protocols.

For many purposes, these chipsets need to know the system (processor) clock frequency used for proper operations. The system (processor) clock frequency is the frequency of a clock signal upon which all synchronous operations on the system bus are timed. The system clock (operating) speed can vary widely and may be rated differently by processor manufacturers for different processors. Currently, system clock (operating) speeds of host processors can vary from 66 MHz to about 500 MHz. Host processors may be rated at a particular clock frequency based on their ability to operate without errors. Typically, processor manufacturers may be very conservative when rating such a clock frequency. For example, a processor which successfully operates during tests at 333 MHz may be only intentionally rated (marked) at only 133 MHz, 150 MHz, 166 MHz, 200 MHz or 250 MHz for different market reasons.

Since most processors can be clocked at frequencies significantly greater than the rated (marked) clock frequencies, there may be a problem with resellers and/or distributors remarking processors at higher frequencies and then selling the processors as the higher speed part to charge for resale at higher prices. This is possible because the system (processor) clock speed may be initialized and set by jumpers from the motherboard at reset. As a result, unscrupulous resellers and/or distributors may purchase less expensive processors that are rated at lower clock frequencies and then remark those processors at higher clock frequencies, a procedure known as over-clocking (operate the processor at a clock frequency greater than the originally rated frequency) for resale at higher prices.

Over-clocking a system (processor) clock frequency may also produce several problems. A common problem of over-clocking relates to bit errors and data corruptions. Usually, chipsets and/or hardware components which need the system clock frequency for computing operations may incorrectly interpret electrical signals between "1" and "0" due to timing violations. More serious problems of over-clocking relate to advanced chipsets which use a random number generator (RNG) for security applications such as cryptography, digital signatures, and protected communication protocols. If the host processor is over-clocked, the statistically random and non-deterministic numbers from the RNG of the chipsets may no longer be random, and the security applications may be severely compromised.

Over-clocking problem may be solved by tying several processor input pins high or low using pull-up and pull-down resistors to select a maximum clock frequency of a host processor. However, this hard-wiring approach to setting a maximum clock frequency is susceptible to external manipulation by users, resellers and/or distributors. A reseller may reconnect these processor input pins to high or low to select a different clock frequency. As a result, the hardwiring approach to solve the over-clocking problem is not secure. Moreover, the hard-wiring approach is inflexible and cumbersome for processor manufacturers.

Therefore, a need exists for a more secure and mechanism for detecting and effectively deterring (preventing) over-clocking of a system (processor) clock signal so as to prevent resellers, distributors and/or end users from operating the processor at a clock frequency that is greater than a rated clock frequency.

SUMMARY

Accordingly, various embodiments of the present invention are directed to a mechanism and method for detecting and deterring over-clocking of a clock signal in a computer system. Such a mechanism may comprise a detection circuit which detects over-clocking of a clock signal based on a reference signal, and a prevention circuit which prevents over-clocking of the clock signal by either disabling operations of the computer system or reducing performance of the computer system in response to detection of over-clocking of the clock signal.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of processors (CPU), controllers, clock generators and chipsets in all computer platforms, including chipsets with I/O controller hubs (ICH) and PCI 64-bit hubs (P64H) and P64H follow-on products, and new chipsets which may become available as computer technology develops in the future.

Figure 1:
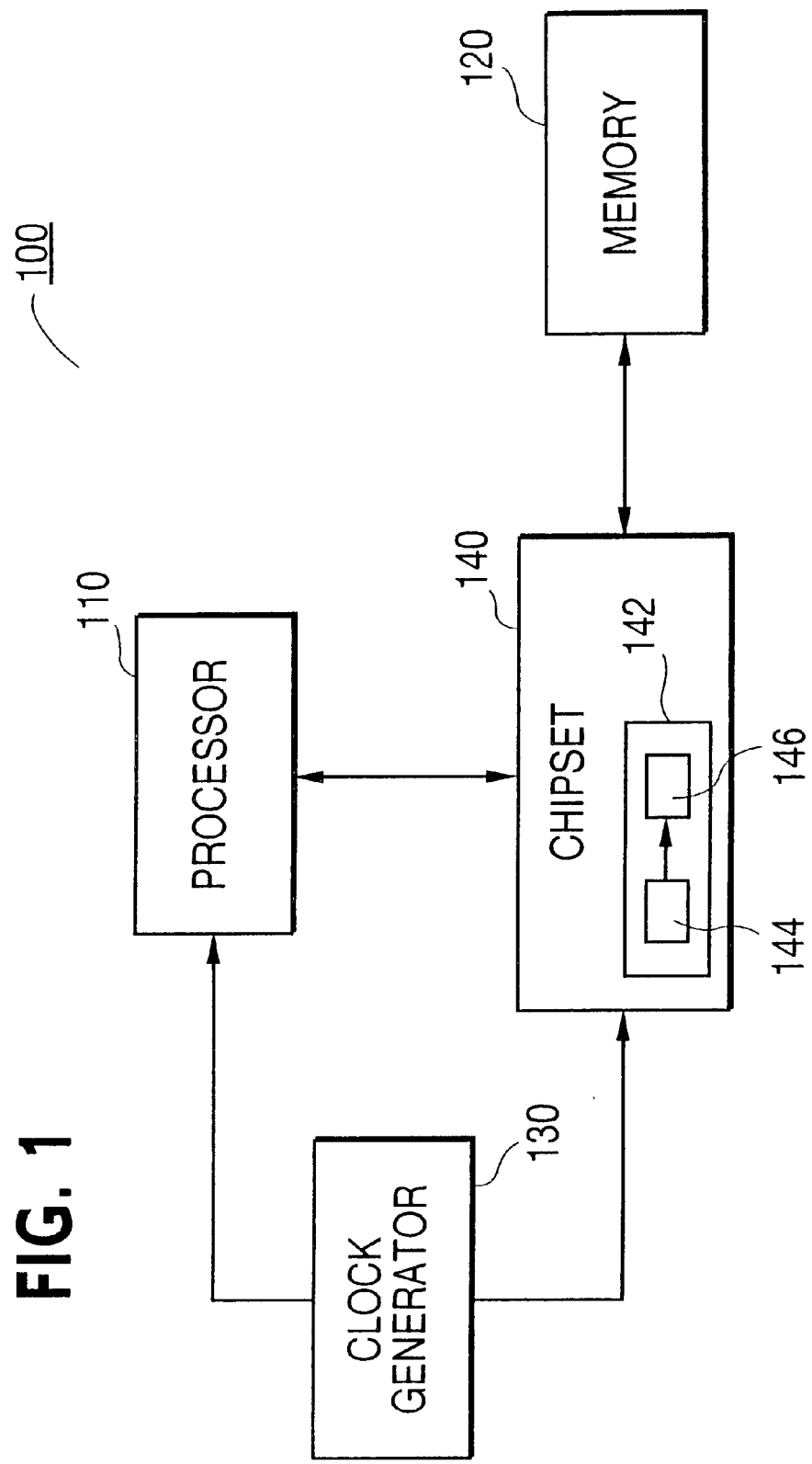
FIG. 1 illustrates a block diagram of an example computer system having an over-clock deterrent mechanism incorporated therein for detecting and deterring over-clocking of a system clock signal according to the principles of the present invention.

Attention now is directed to the drawings and particularly to FIG. 1, an example computer system having an over-clock deterrent mechanism incorporated therein for detecting and deterring over-clocking of a system clock signal according to the principles of the present invention is illustrated. As shown in FIG. 1, the computer system 100 may comprise a processor 110, a memory 120 which stores information and instructions for use by the processor 110, a clock generator 130 which generates a system (processor) clock signal of a predetermined frequency, and a host chipset 140 coupled to the processor 110 and the memory 120 for controlling various aspects of the system in response to the system (processor) clock signal and providing an interface with a plurality of I/O devices including, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices, via peripheral buses such as Peripheral Component Interconnect (PCI) buses of different bandwidths and operating speeds. The PCI bus may be a high performance 32 or 64 bit synchronous bus with automatic configurability and multiplexed address, control and data lines as described in the latest version of *"PCI Local Bus Specification, Revision* 2.1" set forth by the PCI Special Interest Group (SIG) on Jun. 1, 1995 for add-on arrangements (e.g., expansion cards) with new video, networking, or disk memory storage capabilities. Other types of bus architecture such as an Industry Standard Architecture (ISA) bus may also be utilized.

The clock generator 130 may include frequency dividers and/or multipliers which receive an external clock and processor clock frequency selection signals to generate a system (processor) clock signal used for various data processing operations. The processor clock frequency selection signals may be set by processor manufacturers, resellers, distributors and/or end users by way of jumpers at motherboard (not shown) or system basis input/output start up (BIOS) configurations to specify a maximum processor clock frequency. For example, if the processor clock frequency selection signals indicates a processor clock frequency of 333 MHz and the external clock is 166 MHz, then the frequency multipliers may be used to multiply the external clock by a factor of two (2) in order to generate a system (processor) clock signal of 333 MHz.

The host chipset 140 may include an over-clock deterrent mechanism 142 for detecting and deterring over-clocking of a system (processor) clock signal according to the principles of the present invention. In addition, the host chipset 140 may also implement, for example, the I/O bus interface circuitry, timer, real-time clock (RTC), direct memory access (DMA) controller, and other additional functionality such as integrated power and thermal management with quick resume capabilities and random seed number generation for security applications. In particular, the host chipset 140 may include, for example, a graphics memory controller hub which features built-in graphics technology, an integrated audio-codec (AC) controller which enables software audio and modem, a firmware hub (FWH) which contains a system basic input/output start up (BIOS) and a random number generator (RNG) for generating random seed numbers for digital signing and other Internet software applications such as Web browsers in clients and servers, Virtual private networks, E-mail, E-Commerce applications requiring security, Internet Firewalls, Certificate Authority applications, and an I/O controller hub (ICH) which provides direct connection from the graphics and memory to the integrated AC controller, the IDE controllers, dual USB ports, and PCI add-in cards.

As described with reference to FIG. 1, the over-clock deterrent mechanism 142 may be integrated within the I/O controller hub (ICH) rather than provided as a separate chip within a host chipset 140 for simplicity. The over-clock deterrent mechanism 142 may be advantageously utilized to detect over-clocking and effectively deter such an over-clocking of a system (processor) clock signal in the event resellers, distributors and/or end users over-clock such a system (processor) clock signal (operate the processor at a clock frequency greater than the originally rated frequency). Such an over-clock deterrent mechanism 142 may be implemented by an over-clock detection circuit 144 for detecting over-clocking of a system (processor) clock signal based on comparison of ratio of the system (processor) clock signal which is likely to be over-clocked and a fixed, stable reference clock signal which is highly unlikely to be over-clocked, and an over-clock prevention (thwarting) circuit 146 for deterring such an over-clocking by either disabling operations of a computer system or significantly undermining key operations of a computer system. Additional features such as under-clock detection and software over-clock and/or under-clock readable status registration may be included for system diagnostics purposes and Internet-based software diagnostics solutions. The detection circuit 144 may be implemented by logic devices such as counters, comparators, and latches for detecting whether a system (processor) clock signal is over-clocked or under-clocked based on a fixed reference clock signal from either a real-time clock (RTC) quart crystal as will be described with reference to FIG. 2, or a ring oscillator of a fixed frequency as will be described with reference to FIG. 3. The over-clock prevention (thwarting) circuit 146 may be implemented by logic devices for disabling operations (i.e., shut-off power supply) of the computer system as will be described with reference to FIG. 4, and alternatively, for significantly undermining key operations of a computer system such as asserting a stop clock STPCLK# signal to halt the processor operation temporarily as will be described with reference to FIG. 5 and a frequency select signal to select a low performance ratio for the processor as will be described with reference to FIG. 6 hereinbelow.

Figure 2:
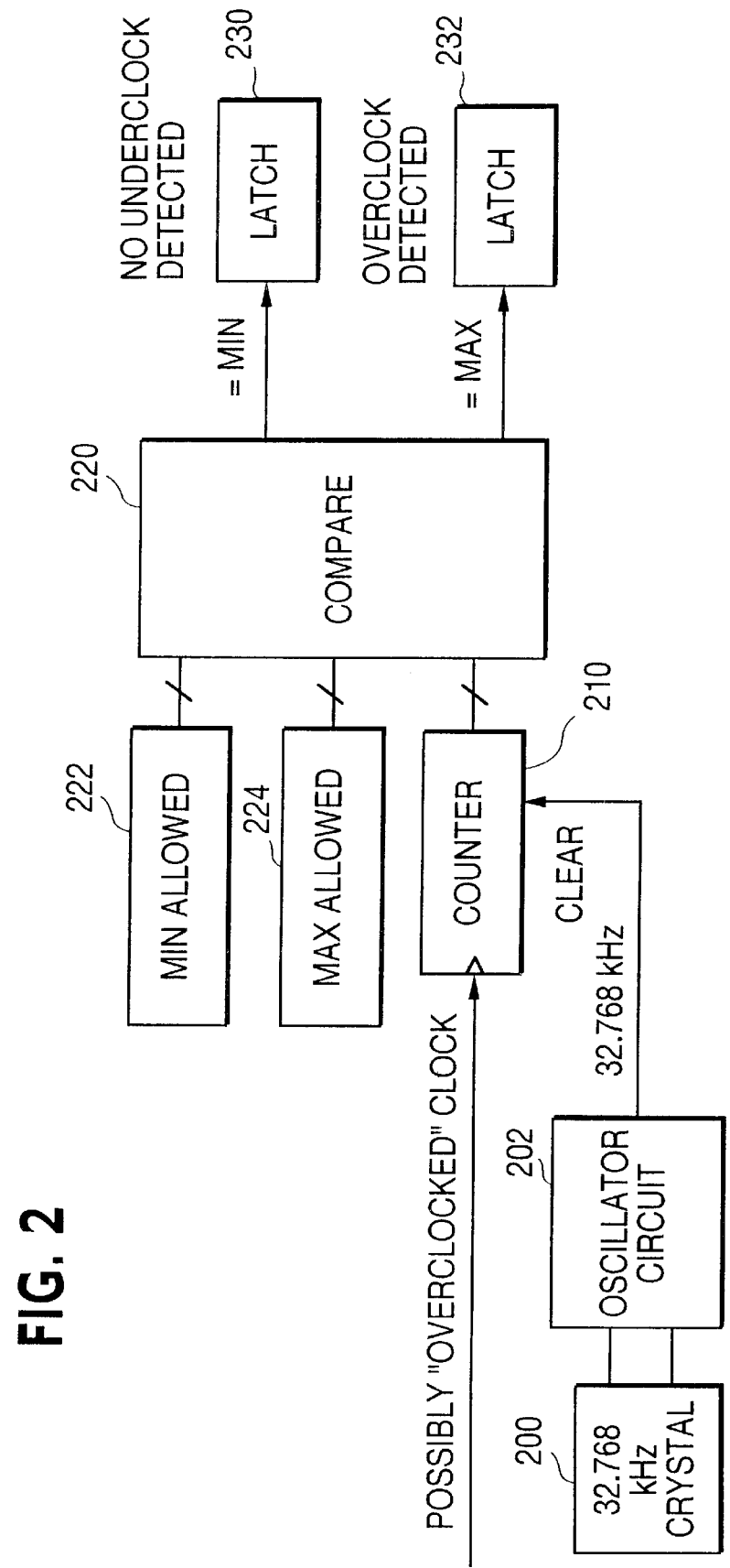
FIG. 2 illustrates a circuit diagram of an example detection circuit of an over-clock deterrent mechanism for detecting over-clocking of a system clock signal according to an embodiment of the present invention.

Refer now to FIG. 2, a circuit diagram of an example detection circuit 144 of an over-clock deterrent mechanism 142 for detecting over-clocking of a system (processor) clock signal according to an embodiment of the present invention is illustrated. The detection circuit 144 may utilize a fixed reference clock signal of a known frequency of 32.768 kHz from a real-time clock (RTC) quart crystal to detect possible "over-clocking" of a system (processor) clock signal. The fixed reference clock signal of 32.768 kHz may be assumed to be fixed (i.e., someone over-clocking would not adjust) since no resellers, distributors and/or end users may consider to run this RTC clock at a higher rate (to keep the ratio the same as with the system clock signal that is being over-clocked). For example, if the RTC clock is adjusted by resellers, distributors and/or end users at a higher rate, the time functions in terms of second, minutes, hours, day of week, date of month, month and year will be incorrect, and the RTC battery will drain more quickly.

As shown in FIG. 2, the detection circuit 144 may include a 32.768 kHz RTC crystal 200 which generates a reference clock signal of 32.768 kHz, an oscillator circuit 202 which ensures passage of the reference clock signal of 32.768 kHz, a counter 210 which counts the high speed clock of an input system (processor) clock signal relative to the low speed clock of a reference clock signal of 32.768 kHz, a comparator 220 which compares a counter value with a reasonable limit (e.g., minimum and maximum allowed ratios provided from minimum and maximum allowed ratio registers 222 and 224), and latches 230 and 232 which latch comparator outputs indicating an over-clock detection or no under-clock detection since outputs of the comparator 220 may go inactive one clock later. The 32.768 kHz RTC crystal 200 and the oscillator circuit 202 may alternatively be integrated into the chipset 140 of FIG. 1, and may not be included in the detection circuit 144. If the RTC crystal 200 and the oscillator circuit 202 are integrated into, for example, an I/O controller hub (ICH) of the chipset 140, then the detection circuit 140 may receive a fixed reference clock signal of 32.768 kHz from the RTC crystal 200 and the oscillator circuit 202 for over-clock detection.

The counter 210 may be clocked by an input system clock that is likely to be over-clocked. The counter 210 may be set or reset to zero (0) by a rising edge of the reference clock of 32.768 kHz that is not likely to be over-clocked so as to count the high speed clock of an input system clock relative to the low speed clock of 32.768 kHz. For example, if an input system clock is 333 MHz which is approximately 10000 times faster than the reference clock of 32.768 kHz, the counter 210 is set to count approximately 10000 clocks. If the counter value is more than the 10000 clocks, then the input system (processor) clock signal will be determined as "over-clocked" (running too fast).

The comparator 220 may determine such an over-clocking based on a comparison of the ratio of the input system (processor) clock signal that is likely to be over-clocked and the reference clock signal that is not likely to be over-clocked using minimum and maximum allowed ratios provided from minimum and maximum allowed ratio registers 222 and 224. In particular, if the counter value reaches the maximum allowed ratio, the comparator output may indicate that an over-clocking condition has been detected (i.e., the system clock signal is over-clocked). If the counter value reaches the minimum allowed ratio, the comparator output may indicate that under-clocking condition has not been detected (i.e., the system clock signal is normal). In addition, if the counter value is below the minimum allowed ratio, the comparator output may indicate that under-clocking condition has been detected (i.e., the system clock signal is under-clocked). Under-clocking condition may indicate that the computer system has several major flaws (defects), including, for example, the quart crystal may be damaged, the phase-locked loop (PLL) circuitry may have locked onto an incorrect frequency ratio. Such under-clocking detection may be highly desirable for PC manufacturers to provide proper system diagnostics.

Figure 3:
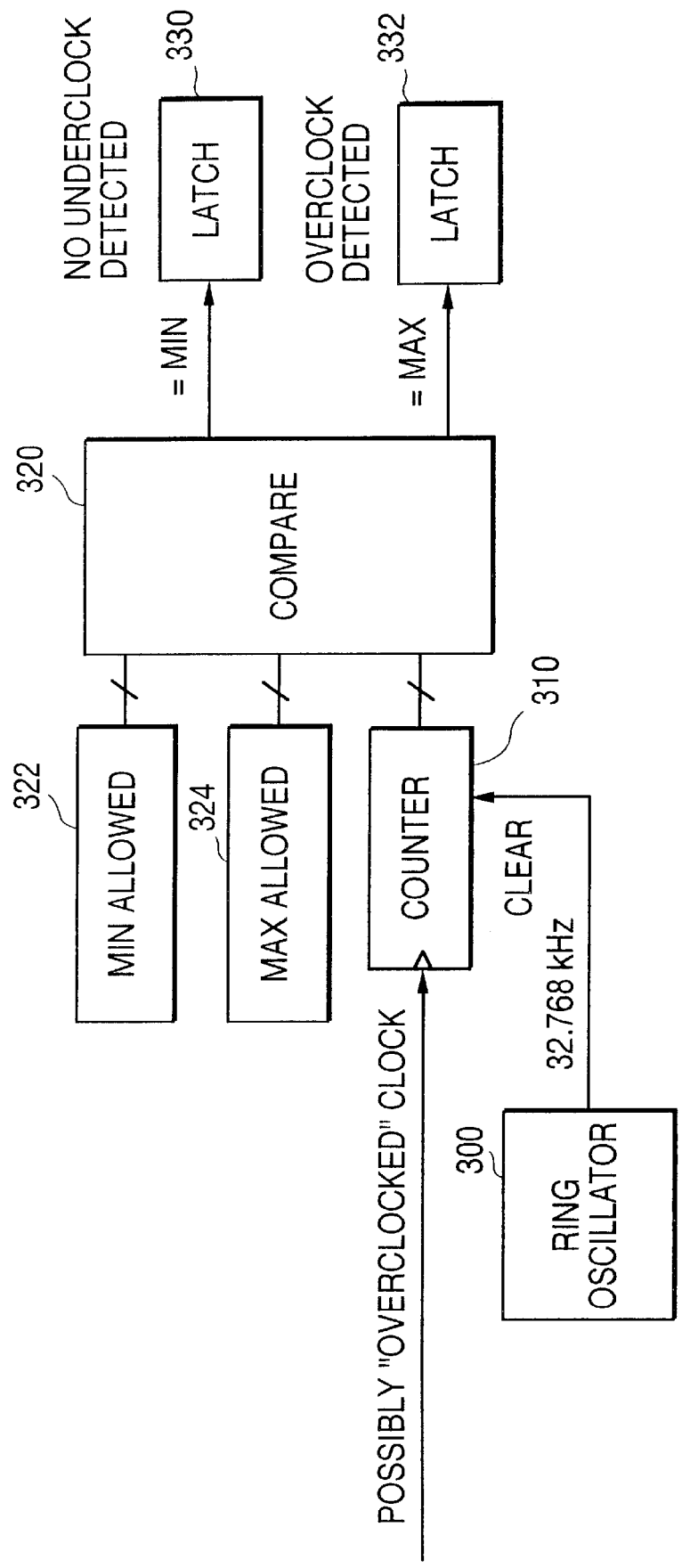
FIG. 3 illustrates a circuit diagram of another example detection circuit of an over-clock deterrent mechanism for detecting over-clocking of a system clock signal according to another embodiment of the present invention.

FIG. 3 illustrates a circuit diagram of another example detection circuit 144 of an over-clock deterrent mechanism 142 for detecting over-clocking of a system (processor) clock signal according to another embodiment of the present invention. The detection circuit 144 of this embodiment may be similar to the embodiment described with reference to FIG. 2. For example, the detection circuit 144 may include a ring oscillator 300 which generates a reference clock signal of any known frequency, a counter 310 which counts the high speed clock of an input system (processor) clock signal relative to the low speed clock of a reference clock signal, a comparator 320 which compares a counter value with a reasonable limit (e.g., minimum and maximum allowed ratios provided from minimum and maximum allowed ratio registers 322 and 324), and latches 330 and 332 which latch comparator outputs indicating an over-clock detection or no under-clock detection since the comparator outputs may go inactive one clock later.

As shown in FIG. 3, the ring oscillator 300 may be built in the silicon and trimmed by a fuse in lieu of the RTC crystal 200 of FIG. 2 to generate a reference clock signal. The ring oscillator 300 may also be integrated into an I/O controller hub (ICH) of the chipset 140. The reference clock signal may exhibit any fixed, stable frequency, including 32.768 kHz for example. Since the reference clock signal may be independently fixed and may not be based on the RTC crystal 200, its fundamental frequency cannot be altered or changed by resellers, distributors and/or end users. Therefore the use of a ring oscillator 300 for generating a reference clock signal may be preferred over the use of a RTC crystal 200 since the fundamental frequency may not be susceptible to over-clocking efforts by resellers, distributors and/or end users.

Figure 4:
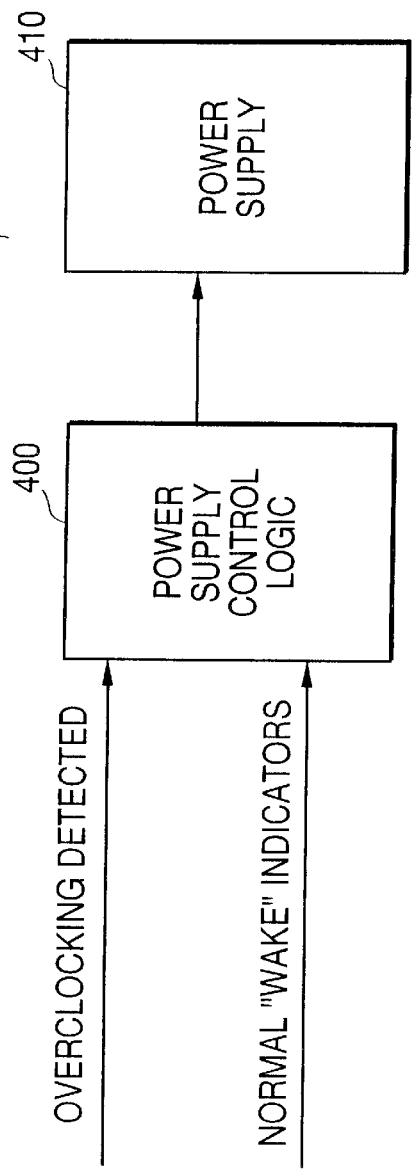
FIG. 4 illustrates a circuit diagram of an example prevention (thwarting) circuit of an over-clock deterrent mechanism using power management logic for deterring (preventing) over-clocking of a system clock signal according to an embodiment of the present invention.

FIG. 4 illustrates a circuit diagram of an example prevention (thwarting) circuit 146 of an over-clock deterrent mechanism 142 using power management logic for deterring over-clocking of a system clock signal according to an embodiment of the present invention. As shown in FIG. 4, the prevention (thwarting) circuit 146 may include a power supply control logic device 400 which deactivates the power supply 410 from attending to the processor 110 for data processing operations, when an over-clock condition has been detected (i.e., system clock signal is over-clocked) from the detection circuit 144. The power supply control logic device 400 may normally turn on the power supply based on various "wake-up" indicators, including wake-up based on the real-time clock (RTC), a general purpose event such as power button being pressed. The power supply control logic device 400 may be integrated into, for example, an integrated power and thermal management module of the chipset 140 of FIG. 1.

Such integrated power and thermal management module may implement a variety of power-saving modes. For example, power management may include clock control which enables the chipset 140 to place the processor 110 into standby mode and throttle the processor 110 to a reduced speed to conserve power consumption and then restore full processing power when needed by applications. peripheral device and system management which enables the chipset 140 to detect when an I/O device is idle and other events in the computer system, system suspend and resume which enables the chipset 140 to place the system in suspend-states and resume-states for increased power savings.

Thermal management may include temperature control which enables the chipset 140 to monitor system temperature and uses active (fan-based) cooling or passive cooling controlled by clock throttling to govern the power consumption of the processor 110. If the power supply control logic device 400 is integrated into the power and thermal management module of the chipset 140, an extra input to power supply control may be included to receive an over-clocking detected signal generated from the detection circuit 144. When the power supply 410 is cut-off, the processor 110 is disabled. This way the unscrupulous resellers and/or distributors may be prevented from purchasing less expensive processors that are rated at lower clock frequencies and then remark those processors to higher clock frequencies at superficially higher resell prices. Similarly, the end users may be prevented from using a computer system that is vulnerable to security risks.

Figure 5:
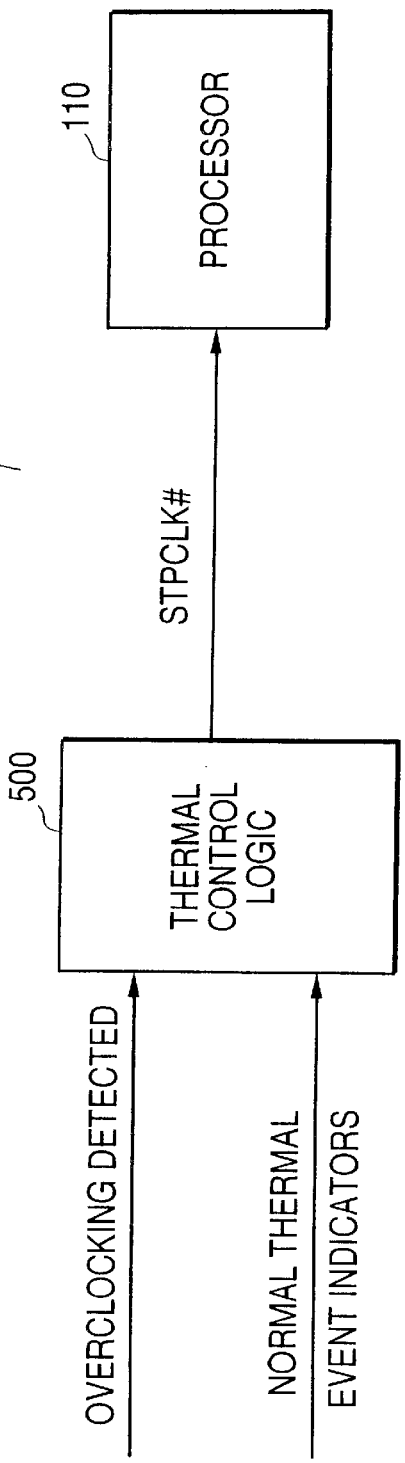
FIG. 5 illustrates a circuit diagram of another example prevention circuit of an over-clock deterrent mechanism using thermal management logic for deterring (preventing) over-clocking of a system clock signal according to another embodiment of the present invention.

FIG. 5 illustrates a circuit diagram of another example prevention (thwarting) circuit 146 of an over-clock deterrent mechanism 142 using thermal management logic for deterring (preventing) over-clocking of a system clock signal according to another embodiment of the present invention. In contrast to the power supply control logic device 400 of FIG. 4, the prevention circuit 146 may alternatively include a thermal control logic device 500 which asserts a stop clock STPCLK signal to the processor 110 in order to halt the processor 110 temporarily from data processing operations, when an over-clock condition has been detected (i.e., system clock signal is over-clocked) from the detection circuit 144. The thermal control logic device 500 may be utilized to lower the power consumed by the processor 110 and lower the processor performance. The thermal control logic device 500 may normally control system temperature based on normal thermal event indicators, including active (fan-based) cooling or passive cooling controlled by clock throttling to govern the power consumption of the processor 110. Such thermal control logic device 500 may also be integrated into a power and thermal management module of the chipset 140. If the power supply control logic device 400 is integrated into the power and thermal management module of the chipset 140, an extra input to thermal control may be included to receive an over-clocking detected signal generated from the detection circuit 142. When the stop clock STPCLK signal is generated, the processor performance is significantly reduced. For example, if a data signal is in active for 10% of the time, the processor performance may seem to run 10 times slower than normal. This way the end users may be prevented from using a computer system and may be forced to return the computer system for inspection.

Figure 6:
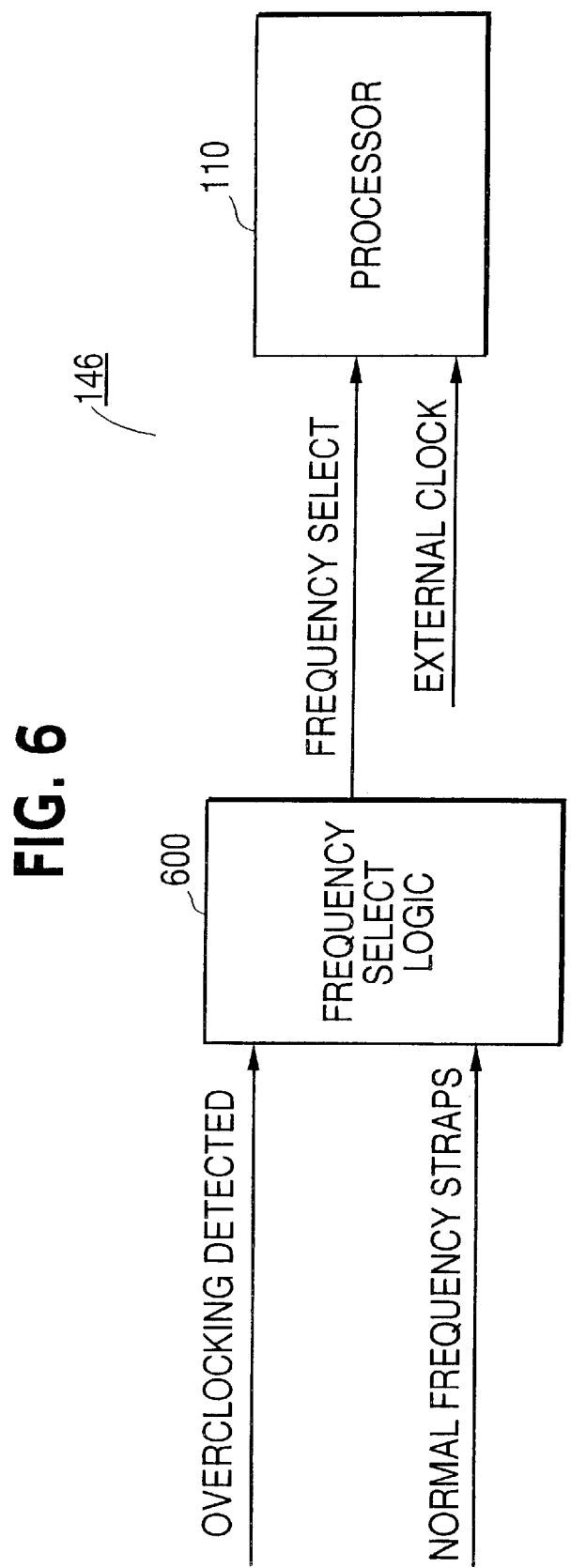
FIG. 6 illustrates a circuit diagram of yet another example prevention circuit of an over-clock deterrent mechanism using frequency straps for deterring (preventing) over-clocking of a system clock signal according to yet another embodiment of the present invention.

FIG. 6 illustrates a circuit diagram of yet another example prevention (thwarting) circuit 146 of an over-clock deterrent mechanism 142 using frequency straps for deterring over-clocking of a system clock signal according to another embodiment of the present invention. In lieu of the thermal control logic device 500 of FIG. 5, the prevention circuit 146 may alternatively include a frequency select logic device 600 which asserts a frequency select signal to the processor 110 in order to reduce the performance ratio of the processor 110, when an over-clock condition has been detected (i.e., system clock signal is over-clocked) from the detection circuit 144. Again, such frequency select logic device 600 may be integrated into a power and thermal management module or other logic components of the chipset 140. If the frequency select logic device 400 is integrated into the chipset 140, an extra input to frequency selection may be included to receive an over-clocking detected signal generated from the detection circuit 144. When the frequency select signal is asserted, the processor 110 may use a significantly lower internal clock frequency for data processing operations based on an external clock. For example, if the processor 110 is marked to run at 333 MHz, the processor frequency may be set to run at 66 MHz, for example. As a result, the end users may be forced to return the computer system for inspection.

Figure 7:
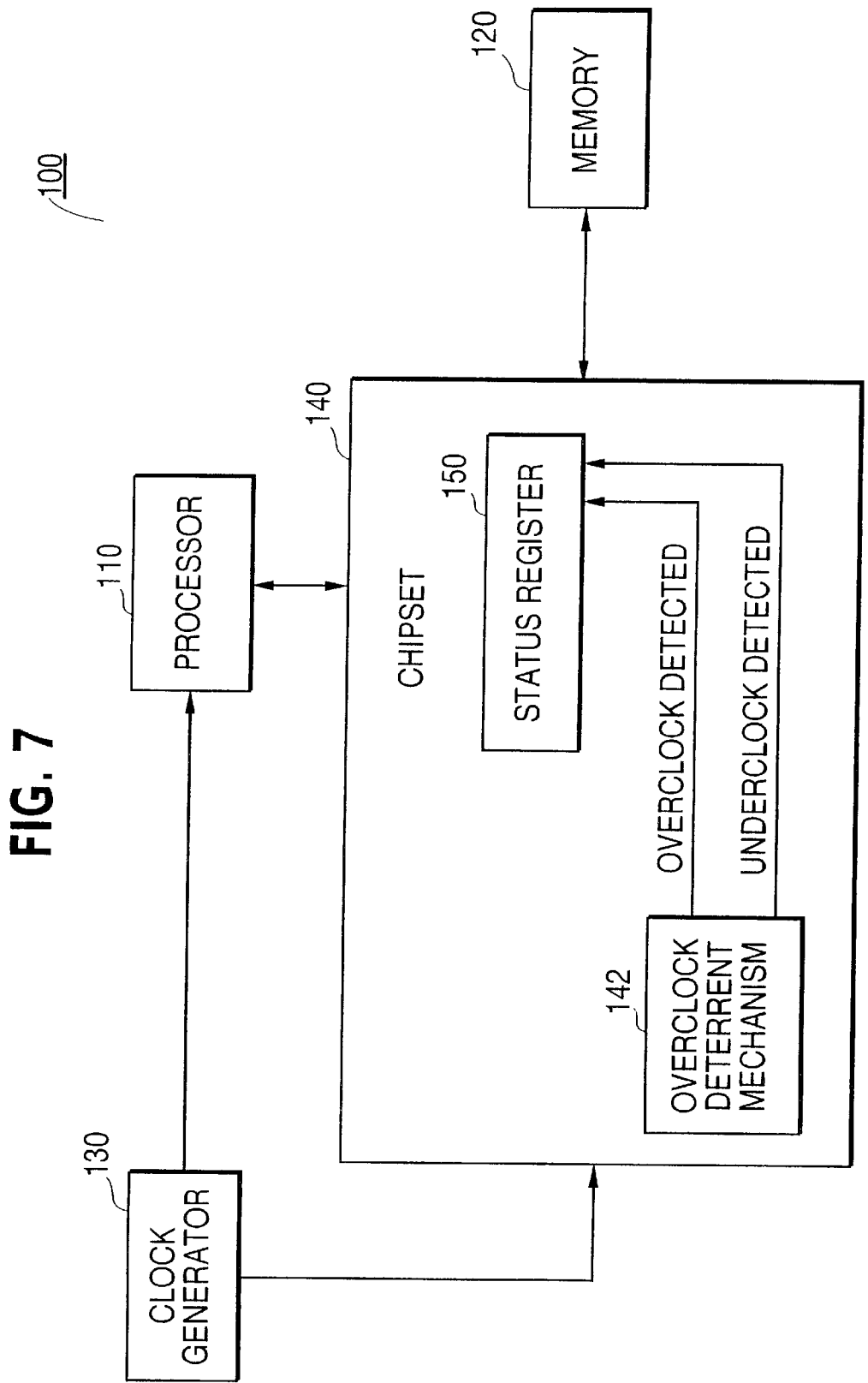
FIG. 7 illustrates a block diagram of an example computer system having another example over-clock deterrent mechanism incorporated therein for detecting and deterring over-clocking of a system clock signal according to the principles of the present invention.

Turning now to FIG. 7, a block diagram of an example computer system 100 having another example over-clock deterrent mechanism 140 incorporated therein for detecting and deterring over-clocking of a system clock signal according to the principles of the present invention is illustrated. As shown in FIG. 7, the computer system 100 may comprise a processor 110, a memory 120 which stores information and instructions for use by the processor 110, a clock generator 130 which generates a system (processor) clock signal of a predetermined frequency, and a host chipset 140 coupled to the processor 110 and the memory 120 for controlling various aspects of the system in response to the system (processor) clock signal and for providing an interface with a plurality of I/O devices.

The host chipset 140 may include a status register 150 in addition an over-clock deterrent mechanism 142 having both an over-clock detection circuit 144 and an over-clock prevention circuit 146 or, alternatively, only over-clocking and under-clocking detection logic for detecting an over-clocking condition and/or an under-clocking condition of a system processor) clock signal according to the principles of the present invention. The status register 150 may be utilized to store software readable status bits which indicate if the system (processor) clock signal is either over-clocked or under-clocked for software diagnostics purposes. The use of the status register 150 for software diagnostics may be advantageous to PC manufacturers who desire not to shoulder support costs to end users who have over-clocked the system (processor) clock signal without authorization. In particular, the PC manufacturers may conveniently read these status register bits either locally or remotely via an Internet-based Web-site when requested by end users for services. Based on the status of the software readable status register bits, the PC manufacturers may refuse service supports of those computer systems that have been over-clocked by the end users. For example, product warranty may be voided by the PC manufacturers if unauthorized over-clocking of a system (processor) clock signal has taken place. However, if the system (processor) clock signal is under-clocked due to system defects, for example, diagnostics software may be utilized to examine the computer system for complete system diagnostics. Alternatively, the system BIOS may also be configured to read these status register bits upon booting to inform end users to request service. This way the PC manufacturers may be informed of operation conditions of the computer system for proper service.

Figure 8:
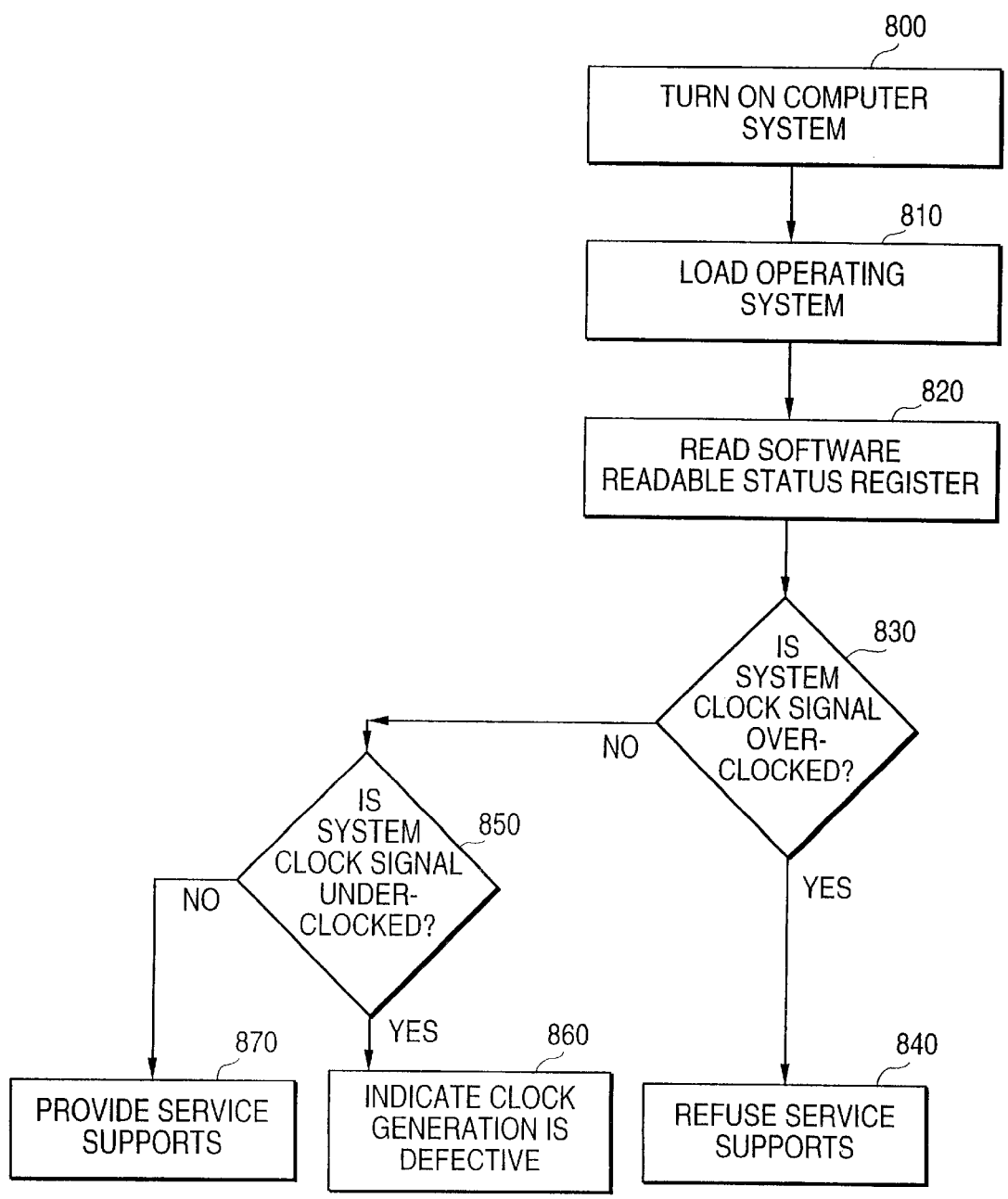
FIG. 8 illustrates an example flowchart of detecting over-clocking and under-clocking of a system clock signal using software readable status register bits according to the principles of the present invention.

FIG. 8 illustrates an example flowchart of detecting over-clocking and/or under-clocking of a system (processor) clock signal using software readable status register bits by PC manufacturers according to the principles of the present invention. At block 800, a computer system 100 may be turned on and a proper initialization sequence may be started during system services by PC manufacturers either locally or remotely via an Internet-based Web site upon request by an end user. The initialization may include loading an operating system (OS) and setting up initial computer parameters at block 810. The initialization sequence may also include reading status register bits at block 820. Based on the software readable register bits, the initialization sequence may determine whether a system (processor) clock signal is over-clocked or under-clocked based on comparison of ratio of the system (processor) clock signal that is likely to be over-clocked and the reference clock signal that is not likely to be over-clocked at block 830.

If the software readable register bits indicate that the system (processor) clock signal is over-clocked, the initialization sequence may inform the PC manufacturers to refuse to provide service support at block 840. However, if the software readable register bits indicate that the system (processor) clock signal is not over-clocked, the initialization sequence may proceed to determine whether such a system (processor) clock signal is under-clocked at block 850. If the software readable register bits indicate that the system (processor) clock signal is not under-clocked (i.e., normal), the initialization sequence may proceed to provide proper service support, including software diagnostics as requested by the end user at block 860. However, if the software readable register bits indicate that the system (processor) clock signal is under-clocked, the initialization sequence may proceed to inform the PC manufacturers that clock generator 130 of the computer system 100 may contain defects and need to be replaced.

As described from the foregoing, the present invention advantageously provides an over-clock deterrent mechanism utilized to detect over-clocking and effectively deter such an over-clocking of a system (processor) clock signal in the event resellers, distributors and/or end users over-clock such a system (processor) clock signal (operate the processor at a clock frequency greater than the originally rated frequency) as well as to detect under-clocking of such a system (processor) clock signal and effectively provide software diagnostics either locally or remotely by way of an Internet-based Web-site.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the computer system as shown in FIG. 1 may be configured differently or employ some or different components than those illustrated. In addition, the over-clock deterrent mechanism shown in FIGS. 2–7 may be configured differently or employ some or different components than those illustrated without changing the basic function of the invention. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A system, comprising:
   a clock generator to generate a clock signal;
   a device operable based on the clock signal; and
   an over-clock deterrent mechanism for detecting and deterring over-clocking of the clock signal, the over-clock deterrent mechanism comprising:
   a detection circuit to detect over-clocking of the clock signal based on a reference signal;
   a prevention circuit to prevent over-clocking of the clock signal by either disabling operations of the device or limiting performance of the device in response to detection of said over-clocking of the clock signal; and
   a status register to store software readable status bits indicating if the clock signal is either over-clocked or under-clocked for software diagnostics purposes.

2. The system as claimed in claim 1, wherein the detection circuit comprises:
   quartz crystal to generate the reference signal exhibiting a fixed clock frequency;
   a counter to count the clock signal relative to the reference signal and to produce a counter value;
   a comparator to determine whether the clock signal has an over-clocking condition based on the counter value with a predetermined ratio; and
   latches to latch comparator outputs indicating at least whether said over-clocking condition has been detected.

3. The system as claimed in claim 2, wherein the counter is clocked by the clock signal, and is set or reset to zero (0) by a rising edge of a clock of the reference signal.

4. The system as claimed in claim 2, wherein the comparator determines said over-clocking condition when the counter value reaches a maxim allowed ratio, and an under-clocking condition when the counter value is below a minimum allowed ratio.

5. The system as claimed in claim 2, wherein the detection circuit comprises:
   a ring oscillator to generate the reference signal exhibiting a fixed clock frequency;
   a counter to count the clock signal relative to the reference signal and produce a counter value;
   a comparator to determine whether the clock signal has an over-clocking condition based on the counter value with a predetermined ratio; and
   latches to latch comparator outputs indicating at least whether said over-clocking condition has been detected.

6. The system as claimed in claim 2, wherein the prevention circuit comprises a power supply control logic circuit to deactivate a power supply from attending to the device and disabling operations of the device, when said over-clock condition has been detected.

7. The system as claimed in claim 2, wherein the prevention circuit comprises a thermal control logic circuit to assert a stop clock signal to the device to halt the device temporarily from operations, when an over-clock condition has been detected.

8. The system as claimed in claim 2, wherein the prevention circuit comprises a frequency select circuit to assert a frequency select signal to the device to reduce an operation frequency of the device, when an over-clock condition has been detected.

9. A system comprising:
   a clock generator to generate a clock signal;
   a host device operable to process information based on the clock signal;
   a chipset coupled to the host device to control operations of the host device in response to the clock signal and provide an interface with a plurality of I/O devices, said chipset comprising:
      a mechanism to determine whether the clock signal is either over-clocked or under-clocked; and
      a status register to store status bits indicating if the clock signal is over-clocked or under-clocked.

10. The system as claimed in claim 9, wherein said mechanism for determining whether the clock signal is over-clocked or under-clocked comprises:
   a detection circuit to detect whether the clock signal is over-clocked or under-clocked based on a reference signal; and
   a prevention circuit to prevent over-clocking of the clock signal by either disabling operations of the host device or reducing performance of the host device, when the clock signal is over-clocked.

11. The system as claimed in claim 10, wherein the detection circuit comprises:
   a quartz crystal to generate the reference clock signal exhibiting a fixed clock frequency;
   a counter to count cycles of the clock signal relative to the reference signal and to produce a counter value;
   a comparator to determine whether the clock signal is over-clocked or under-clocked based on the counter value with a predetermined ratio; and
   latches to latch comparator outputs indicating at least whether the clock signal is over-clocked or under-clocked.

12. The system as claimed in claim 11, wherein the detection circuit comprises:
   a ring oscillator to generate the reference signal exhibiting a fixed clock frequency;
   a counter to count cycles of the clock signal relative to the reference signal and to produce a counter value;
   a comparator to determine whether the clock signal is over-clocked or under-clocked based on the counter value with a predetermined ratio; and
   latches to latch comparator outputs indicating at least whether the clock signal is over-clocked or under-clocked.

13. The system as claimed in claim 11, wherein the prevention circuit comprises a power supply control logic circuit to deactivate power supply from attending to the host device and disables operations of the host, when said clock signal is over-clocked.

14. The system as claimed in claim 11, wherein the prevention circuit comprises a thermal control logic circuit to assert a stop clock signal to the host device to halt the host device temporarily from operations, when the clock signal is over-clocked.

15. The system as claimed in claim 11, wherein the prevention circuit comprises a frequency select circuit to assert a frequency select signal to the host device to reduce an operation frequency of the host device, when the clock signal is over-clocked.

16. A method for detecting over-clocking and/or under-clocking of a clock signal of a host device, comprising:
   loading an operating system and executing an initialization sequence;
   reading software status register bits to determine whether a clock signal is over-clocked or under-clocked;
   indicating that the host device is not serviceable if the software readable register bits indicated that the clock signal is over-clocked;
   determining whether the clock signal is under-clocked if the software readable register bits indicated that the clock signal is not over-clocked;
   providing software diagnostics if the software readable register bits indicate that the clock signal is not under-clocked; and
   indicating that clock generation of the host device contains defects if the software readable register bits indicated that the clock signal is under-clocked.

17. A system comprising:
   a clock generator to generate a clock signal for data processing operations;
   a device operable to process data information based on the clock signal; a chipset coupled to the device which comprises a reference signal for providing real-time clock, and an over-clock deterrent mechanism for detecting over-clocking of the clock signal based on the reference signal, and deterring said over-clocking of the clock signal by either disabling operations of the device or reducing performance of the device in response to detection of said over-clocking of the clock signal.

18. The system as claimed in claim 17, wherein said chipset further comprises a status register to store software readable status bits which indicated if the clock signal is either over-clocked or under-clocked for software diagnostics.

19. The system as claimed in claim 17, wherein the over-clock deterrent mechanism comprises:
   a counter to count cycles of the clock signal relative to the reference signal and to produce a counter value;
   a comparator to determine whether the clock signal has an over-clocking condition based on the counter value with a predetermined ratio;
   latches to latch comparator outputs indicating at least whether said over-clocking condition has been detected; and
   a power supply control logic circuit to deactivate power supply from attending to the device and disables operations of the device, when said over-clock condition has been detected.

20. The system as claimed in claim 17, wherein the over-clock deterrent mechanism comprises:
   a counter to count cycles of the clock signal relative to the reference signal and to produce a counter value;
   a comparator to determine whether the clock signal has an over-clocking condition based on the counter value with a determined ratio;

latches to latch comparator outputs indicating at least whether said over-clocking condition has been detected; and a thermal control logic circuit to assert a stop clock signal to the device so as to halt the device temporarily from operations, when said over-clock condition has been detected.

21. The system as claimed in claim 17, wherein the over-clock deterrent mechanism comprises:

a counter to count cycles of the clock signal relative to the reference signal and to produce a counter value;

a comparator to determine whether the clock signal has an over-clocking condition based on the counter value with a predetermined ratio;

latches to latch comparator outputs indicating at least whether said over-clocking condition has been detected; and a frequency select circuit to assert a frequency select signal to the processor so as to reduce an operation frequency of the device, when an over-clock condition has been detected.

* * * * *

UNITED STATES PATENT AND TRADEMARK OFFICE
CERTIFICATE OF CORRECTION

PATENT NO.     : 6,754,840 B2
DATED          : June 22, 2004
INVENTOR(S)    : Poisner It is certified that error appears in the above-identified patent and that said Letters Patent is hereby corrected as shown below:

Column 10,
Line 25, insert -- a -- before "quartz".
Line 40, delete "maxim" and insert -- maximum --, therefor.

Signed and Sealed this

Twenty-eighth Day of December, 2004

JON W. DUDAS
*Director of the United States Patent and Trademark Office*